INVENTOR
John L. Snyder, III
BY Thomas A. Harwood
ATTORNEY

INVENTOR
John L. Snyder, III
BY Thomas A. Harwood
ATTORNEY

United States Patent Office 3,424,516
Patented Jan. 28, 1969

3,424,516
PRISM SYSTEM COMPRISING JOINED
PENTAPRISMS
John L. Snyder III, Garland, Tex., assignor to Texas
Instruments Incorporated, Dallas, Tex., a corporation
of Delaware
Filed May 28, 1964, Ser. No. 371,070
U.S. Cl. 350—286                                9 Claims
Int. Cl. G02b 5/04

ABSTRACT OF THE DISCLOSURE

A piston system is shown which comprises two pentaprisms joined at one of their surfaces. Light rays entering the prism system emerge from the system parallel to the direction of the entering rays, and the path of the rays emerging from the system is invariant to the movement of the prism system about either of two perpendicular axes.

---

This invention relates to a prism system. More specifically, it relates to a prism system for directing a light beam incident thereon along a path perpendicular to the incident light beam and for redirecting the light beam back along a path parallel to the incident beam when the directed beam is reflected back into the prism system by a reflecting surface which is parallel to the incident beam, whereby the light beam paths are invariant to movement of the prism system about two perpendicular axes of rotational freedom.

Many and various prism systems are available for deviating or directing a light beam along a prescribed path. In most cases, the prism system is mounted to an apparatus which is associated with the light beam, whereby the path along which the light beam is directed depends, at least to some extent, on the orientation of the prism system relative to the incident light beam. Thus if the prism system is moved or rotated relative to the incident light beam, the path along which the light beam is directed is also varied or rotated. Many of these optical apparatuses require great accuracy and orientation of the optical paths, whereby some means of compensation must be provided to eliminate any variance of the optical path as a function of the movement of a prism system relative thereto. One such apparatus is disclosed in the copending application of the same inventor entitled Optical Instrument for Determining the Parallelism or Non-Parallelism of Two Reflecting Surfaces, Ser. No. 349,454, filed Mar. 4, 1964. This apparatus directs, by means of 90° prism systems which are the subject matter of this invention, a pair of parallel light beams onto a pair of spaced reflecting surfaces along paths perpendicular to the parallel beams, and the directed beams are respectively reflected from the two reflecting surfaces back into the prism systems which then redirect the light beams back along paths parallel to the original beams. Should the two reflecting surfaces not be parallel, the redirected light beams will be out of parallelism by the same or proportional degree, so that the apparatus effectively determines the degree of non-parallelism of the two reflecting surfaces. It is apparent that any movement of the prism system relative to the incident light beams that alters the paths of the directed light beams is undesirable, and as described in the copending application, the prism systems are such as to produce no substantial effect on the direction of the light beam paths for movement thereof about two axes of rotational freedom. Thus, compensation means for undesirable prism movement is obviated or substantially simplified. Although the above copending application discloses one embodiment of the present invention, this and other embodiments will be described below, where other applications thereof will undoubtedly become readily apparent.

There is provided by the invention, in accordance with these objects, a prism system which will direct a light beam incident on one face thereof out of another face along a path perpendicular to the incident beam, and when the directed beam is reflected back into the prism system by a reflecting surface which is parallel to the incident light beam, the beam is redirected along a path which is parallel to the incident beam. The prism system is characterized by the fact that the paths of the directed and redirected light beam are invariant to movement of the prism system about two perpendicular axes, or any axis lying in the plane defined by these two axes, of rotational freedom. The system is comprised of two pentaprisms, each of which changes the direction of a light beam by 90°. In one embodiment, the redirected light beam is parallel to the original incident beam and travels in the oppose direction thereto, wherein this embodiment comprises the combination of a plane pentaprism and a roof pentaprism. In another embodiment, the redirected light beam is parallel to the original incident beam and travels in the same direction therewith, wherein this embodiment comprises the combination of two plane pentaprisms.

Other objects, features and advantages will become apparent from the following detailed description of the invention when taken in conjunction with the appended claims and attached drawings wherein like reference numerals refer to like parts throughout the several figures, and in which:

Figure 1:
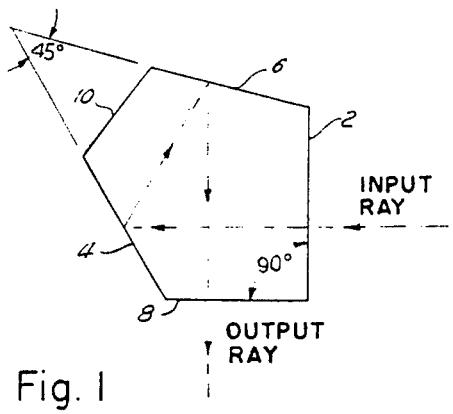
FIGURE 1 is a plan view of a conventional plane pentaprism showing a light beam being directed along a path 90° to its direction of incidence with the principal plane of the prism lying in the plane of the drawing.

Since the prism system of the invention is comprised of the combination of a pair of pentaprisms to provide the features set forth above, a brief discussion relating to the individual pentaprisms of which the prism system is comprised and the effect they have on an incident light beam will be helpful to an understanding of the invention. Referring specifically to FIGURE 1, there is shown, in plan view, a conventional plane pentaprism with its principal plane lying in the plane of the drawing. The prism has five sides, as shown, and an input ray incident upon face 2 is reflected a first time off of face 4 which is silvered for this purpose. The reflected ray is directed on another face 6 which is also silvered and is reflected a second time toward face 8 through which it emerges as an output ray. The pentaprism is thus seen to cause reflections of a light beam from two faces with the light beam passing through two additional faces. Moreover, the conventional pentaprism is designed and constructed to direct the output ray or beam along a path making an angle of 90° to the input ray. To effect this, the two reflecting faces 4 and 6 must make an angle of 45° to each other, as shown. Moreover, the two faces 2 and 8 through which the light ray passes must make an angle of 90° to each other as shown.

Figure 2:
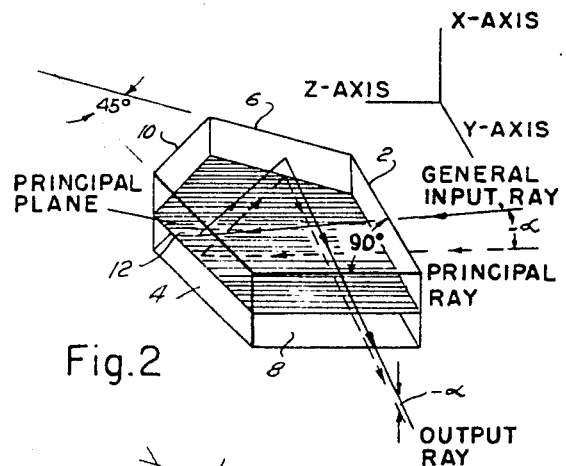
FIGURE 2 is a perspective view of the prism shown in the plan drawing of FIGURE 1.

The path of the light ray through the plane pentaprism is seen more clearly in the perspective view of FIGURE 2. The principal plane 12 of the plane pentaprism is defined as a plane perpendicular to both the reflecting surfaces 4 and 6, with the principal plane being shown by a shaded surface, and a principal ray, indicated by the dashed line, is a light ray or beam which lies in the principal plane of the prism. If a beam of light enters one of the faces, such as face 2, for example, it will emerge from face 8 at 90° to the entering ray. The direction of the output ray relative to the input ray is unaffected by rotation of the prism about an axis perpendicular to the principal plane, or what will now be referred to as the x-axis as shown. The solid line depicts a ray which has an angle of $-\alpha$ with respect to the principal plane, wherein the sign convention of the angle of this general input ray is taken as negative when going down and positive when going up relative to the principal plane. This ray passes through the prism in a manner similar to that of the principal ray, although not in the principal plane, where the same angle, including the sign, is maintained with respect to the principal plane. Both of the rays are first reflected off the surface 4 and then off the surface 6, where the rays emerge from the face 8. A conventional pentaprism does not utilize the critical angle effect to produce these reflections because the rays strike the reflecting surfaces at an angle greater than the critical angle, and consequently, the reflecting surfaces are silvered to produce reflections. In conventional pentaprisms as shown here, neither the general input ray nor the principal ray is affected by rotation of the prism about an axis perpendicular to its principal plane, or the x-axis.

Figure 3:
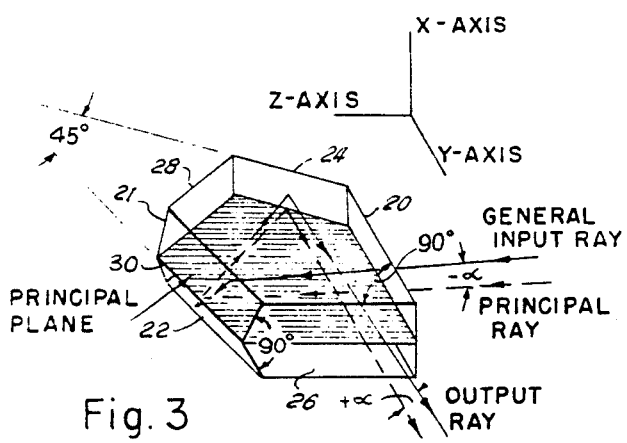
FIGURE 3 is a perspective view of a conventional roof pentaprism.

A perspective view of a roof pentaprism is shown in FIGURE 3 which is similar to the plane pentaprism with the exception that a roof is formed at one of the reflecting surfaces. Thus the roof pentaprism has a face 20 corresponding with face 2 of the plane prism, a roof comprising two reflecting surfaces 21 and 22 in place of face 4 of the plane prism, and faces 24 and 26 corresponding to faces 6 and 8 of the plane prism. In the case of the roof pentaprism, the two surfaces 21 and 22 comprising the roof are at 90° to each other with the apex of the roof, which is the line of intersection of the two surfaces 21 and 22, making an angle of 45° with the reflecting surface 24. The two surfaces 21 and 22 are silvered to produce reflections, as is reflecting surface 24. The function of the roof pentaprism is the same for the plane pentaprism except that a light ray entering face 20 with a negative angle with respect to the principal plane will emerge with an angle of equal magnitude but with a positive sign. In other words, if the ray is entering downward, it will emerge upward at an equal angle. The principal plane is defined as the plane which contains the intersection line of the two reflecting surfaces 21 and 22 and is perpendicular to the reflecting face 24. The propagation of light rays through the prism is illustrated by the general ray shown in the drawing wherein it is reflected internally off the roof section 21 and down onto the roof section 22. It is again reflected from the latter section upward onto the reflecting surface 24 and again out of the face 26. It can be seen that the ray entering with a negative angle will emerge with the positive angle of the same magnitude. In order that the output ray be directed at 90° to the input ray, the faces 20 and 26 must also be at 90° to each other. Moreover, like the plane pentaprism, light rays passing through the roof pentaprism are unaffected by rotation of the prism about an axis perpendicular to its principal plane, or the x-axis as shown. In both the plane and roof pentaprisms, the light rays can proceed through the prism in the opposite direction such as by entering faces 8 and 26, respectively, and emerging from faces 2 and 20 with the same considerations applying. No consideration of refractions at the prism-air interfaces has been made, since the ray will be refracted twice to produce a canceling effect of any additional deviation.

One embodiment of the invention comprises the combination of a plane pentaprism and a roof pentaprism to provide a prism system wherein an input ray is directed along a path 90° to its direction of incidence. When the directed ray is reflected off a reflecting surface, which is parallel to the incident ray, back into the prism through the face from which the directed ray emerges, it is redirected back along a path parallel to the incident light ray but in the opposite direction. As will be shown hereinafter, the paths of the directed and redirected light rays remain invariant to rotation of the prism system about either the x or y-axes. As shown in the plan view of FIGURE 4, a roof pentaprism is joined along its reflecting surface 24 to the surface 8 of the plane pentaprism by means of additional wedge of glass 32 added between the two prisms to establish the face 20 of the roof prism and face 2 of the plane prism in the same plane. An input ray incident on the face 20 of the roof prism is reflected within the prism and out the side 26 exactly as described in conjunction with FIGURE 3 and is directed on a reflecting surface 34. The light ray is then reflected from the surface 34 back onto the roof prism through face 26 and passes through the reflecting surface 24. In this case, the reflecting surface 24 is half-silvered so that a portion of the light ray striking thereon is reflected and a portion is transmitted. The ray is then reflected off side 6 of the plane prism and again off face 4 where it is redirected out of face 2. The redirected light ray is parallel to the incident input ray if the reflecting surface 34 is parallel to the input ray. It is necessary for this that face 2 of the plane pentaprism be parallel to face 20 of the roof pentaprism. It can be seen that the prism system of FIGURE 4 can be comprised of two conventional pentaprisms, one a roof prism and one a plane prism with an additional wedge of glass 32 positioned therebetween, as shown, or can be comprised of a conventional pentaprism either of the roof or the plane prism type with another pentaprism incorporating the additional wedge.

Figure 4:
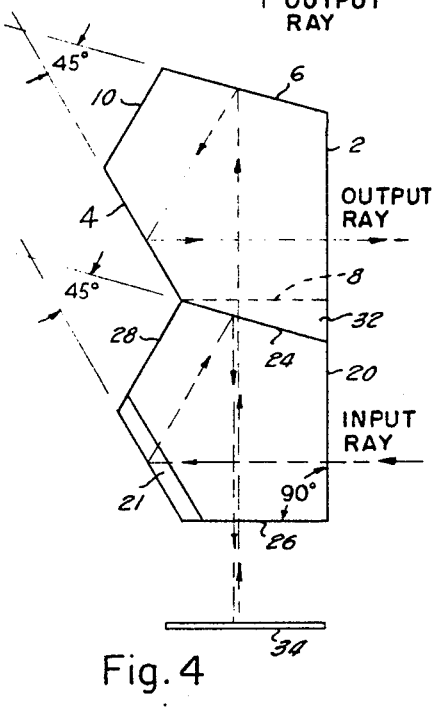
FIGURE 4 is a plan view of one embodiment of the invention which comprises the combination of a plane pentaprism and a roof pentaprism.
Figure 5:
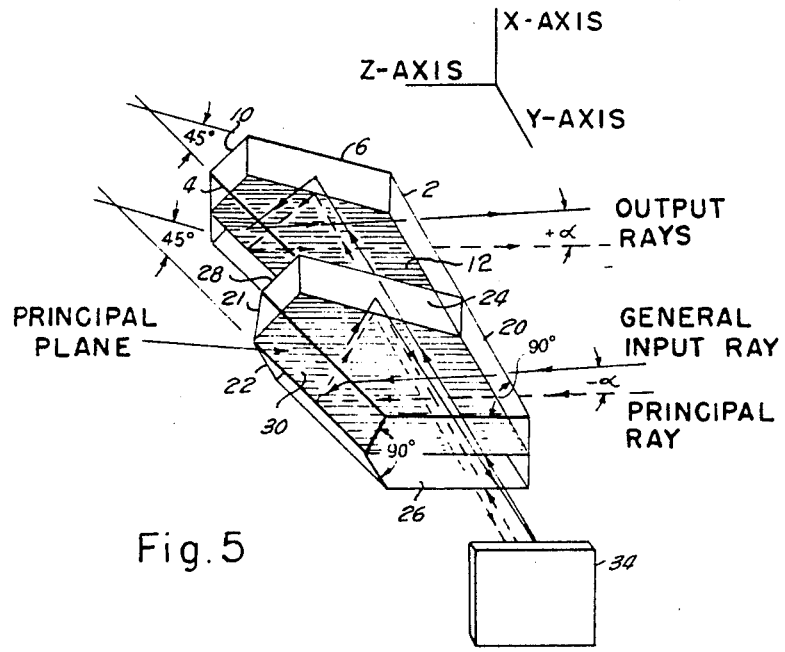
FIGURE 5 is a perspective view of the embodiment shown in FIGURE 4.

A perspective view of the embodiment of FIGURE 4 is shown in FIGURE 5, wherein it can be seen that rotation of the prism system about an axis (x-axis) perpendicular to the principal plane thereof, which is the plane defined by principal planes 12 and 30, will in no way affect the directions of the directed or redirected rays, all for the same reasons discussed above. Now, it needs to be considered whether rotation of the prism assembly about the y-axis will affect the angle of the directed ray on the surface 34 or the angle of the redirected ray. It will first be noted how the ray passes through the prism assembly, wherein again the principal rays are those lying in a principal plane. A general input ray is shown entering a front face 20 of the roof prism where it is reflected off the roof sections 21 and 22 as previously described. The ray is again reflected off the interface 24 joining the two prisms, which is half-silvered for this purpose, whereby the ray is directed out of the face 26 onto a reflecting surface 34. This ray is reflected back into the prism assembly through the face 26, wherein a portion is transmitted through the half-silvered surface 24 to the face 6 of the plane prism. It is reflected off face 6 onto face 4, where it is again reflected out of face 2. Tracing the ray, it will be seen that if the input ray is initially at an angle of $-\alpha$ to the principal plane, the ultimate output ray will be at an angle of $+\alpha$ since the roof prism changes the sign of the angle.

It will be noted that rotation of the prism assembly about the y-axis is equivalent to the rotation of the input ray about the y-axis. That is, saying that the output ray is unaffected by prism rotations about the y-axis is equivalent to saying that the output ray will remain parallel to the input ray as the input ray is rotated about the y-axis. The system will be analyzed from the latter standpoint. From traversing the ray through the prism system where it has been shown that an input ray entering at an angle of —α produces a redirected ray leaving at an angle of +α, which is parallel to the input ray but being propagated in the opposite direction, it becomes apparent that regardless of the angle of the input ray relative to the principal plane, the redirected ray will be parallel thereto and progressing in an opposite direction. This is equivalent to saying that rotation of the prism assembly about the y-axis in no way affects the redirected ray. Thus it can be seen that the prism assembly shown in FIGURE 5 is insensitive to rotation about both the x and y-axes, since rotations about the x-axis perpendicular to its principal plane do not affect the ray.

Rotation of the reflecting surface 34 about the z-axis, for example, will affect the angle that the ray makes with respect to the principal plane after reflection. Since this angle is unaffected by passage through the plane pentaprism, the redirected ray will simply be rotated about the y-axis by an amount equal to twice the angle that the reflecting surface was rotated about the z-axis. Rotation of the reflecting surface about the x-axis causes the redirected ray to be rotated about the x-axis, but by an amount equal to twice the angle through which the reflecting surface was moved. Rotation of the reflecting surface about the y-axis, of course, produces no effect on the redirected ray. From all of this, it can be seen that the prism assembly shown in FIGURE 5, which illustrates one embodiment of the invention, produces no effect on the redirected ray in relation to its parallelism with the input ray when it is rotated about either the x or y-axes, and only rotation of the reflecting surface 34 alters the angle between the input and output rays. As described in the above copending application, this is how the parallelism of the reflecting surface in relation to some other surface is measured. Another means is used to compensate or correct for rotations of the prism systems about the z-axis, which is not the subject matter or concern of this invention.

The foregoing embodiment utilized the combination of a plane pentaprism and a roof pentaprism with an additional wedge of glass used between the two which can be a separate piece of glass or can form an integral part of either of the prisms. The exact orientation of the two prisms relative to each other can be varied, however, whereby the initial input ray can enter the face of the plane pentaprism and the redirected ray leave the face of a roof pentaprism. Moreover, the two prisms can essentially be interchanged. Further, there are essentially four reflecting surfaces in the system (actually five when it is considered that there are two reflections on the roof surfaces), and the roof section can be provided on any one of these four. That is, the roof section merely provides the inversion of the ray as previously described and its location is not restricted as shown in FIGURES 4 and 5. Thus the roof can go on any of faces 4, 6 or even the inner reflecting surface 24. It will also be noted that at least one roof section is required and that three roof sections may be used if so desired, but that an even number of roof sections cannot be used.

Figure 6:
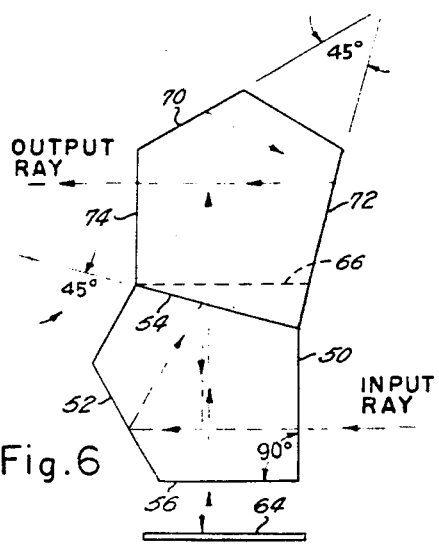
FIGURE 6 is a plan view of another embodiment of the invention which comprises the combination of two plane pentaprisms.
Figure 7:
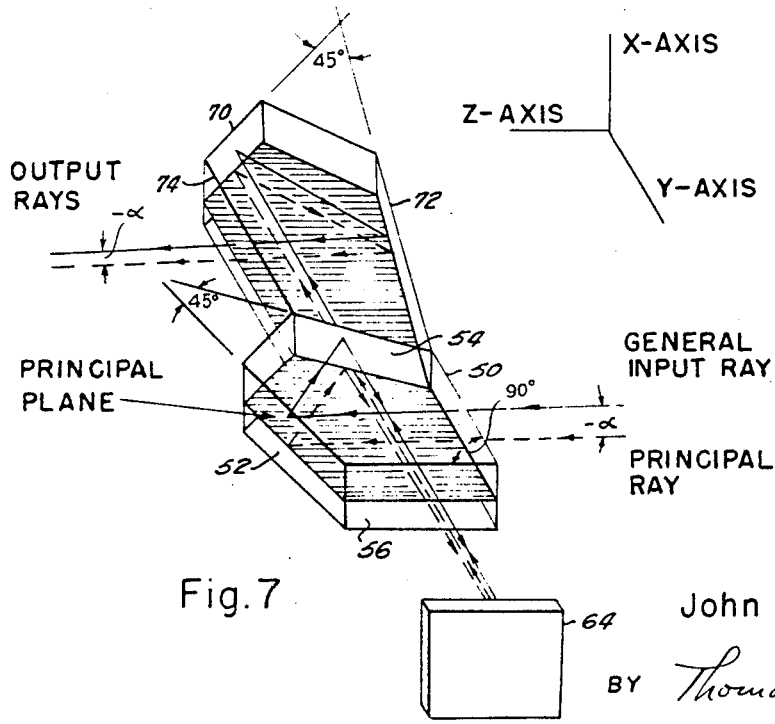
FIGURE 7 is a perspective view of the embodiment shown in FIGURE 6.

Another embodiment of the invention is shown in the plan view of FIGURE 6 and in the perspective view thereof in FIGURE 7. The prism assembly shown in these views is likewise insensitive to rotation about two axes. In this embodiment, however, the redirected ray is propagated in the same direction as, although also parallel with, the input ray rather than in the opposite direction thereto. To provide such a system, the embodiment of FIGURE 6 is comprised of two plane pentaprisms joined together in reverse orientations. Referring specifically to FIGURE 6, an input ray entering one face 50 of a plane prism is reflected off a surface 52 onto surface 54, where it is again reflected off surface 54 out of face 56 onto a reflecting surface 64. This plane prism is identical to the plane prism shown in FIGURE 1. A second identical plane prism is joined to face 54 of the first prism through a wedge 66 but with the second prism facing the opposite direction as the first prism. That is to say, the second prism is rotated 180° to the first prism. Tracing a light ray through the prism system, an input ray entering face 50 of the first prism is reflected off faces 52 and 54 thereof onto the reflecting surface 64, where the output ray is reflected back to the first prism and passes through the half-silvered surface 54. As the light ray enters the second prism through face 54, it is reflected off the two faces 70 and 72, where it is directed out of face 74 and propagating in the same direction as the input ray and parallel thereto. For the same reasons as noted above, rotation of the prism system about either the x or y-axes in no way affects the direction of the redirected ray relative to the input ray. To maintain parallelism between the input and output rays, the same sign of the angle that the input ray makes with the principal plane must be maintained for the output ray. Consequently, a roof is not required in this embodiment, since a reversal of sign is not required.

Other embodiments and variations will undoubtedly occur to those skilled in the art, whereby it is intended that the invention be limited only as defined in the appended claims.

What is claimed is:
1. A prism system comprising:
(a) a first prism defining
(i) first and second surfaces disposed at 90° to each other,
(ii) a third surface disposed relative to said first surface for intercepting a light beam entering said first prism through said first surface along a first path of incidence and for reflecting said light beam,
(iii) a fourth surface disposed 45° to said third surface for intercepting said light beam reflected from said third surface and for reflecting said light beam out of said first prism through said second surface along a second path,
(iv) said fourth surface being adapted to transmit a light beam incident thereon which enters said first prism through said second surface, and
(v) a first principal plane perpendicular to said third and said fourth surfaces, and
(b) a second prism disposed relative to said first prism for intercepting a light beam transmitted out of said first prism through said fourth surface and defining
(i) a fifth surface parallel to said first surface,
(ii) a sixth surface disposed relative to said fourth surface for reflecting said light beam transmitted through said fourth surface,
(iii) a seventh surface disposed 45° to said sixth surface for intercepting said light beam reflected from said sixth surface and for reflecting said light beam out of said second prism through said fifth surface along a third path, and
(iv) a second principal plane perpendicular to said sixth and said seventh surfaces and parallel to said first principal plane,
(c) said first and second prisms comprising a single composite body so that said light beam transmitted through said fourth surface enters said second prism substantially without deflection.

2. A prism system according to claim 1 wherein said second prism is joined to said fourth surface of said first prism.

3. A prism system according to claim 1 in which said fifth surface and said first surface lie in the same plane.

4. A prism system according to claim 3 in which said third surface is folded 90° along a line at the center of said surface in a direction parallel to said first principal plane, the apex of said fold pointing in the same direction as the direction of propagation of said light beam along said first path, and an extension of said apex forming said 45° angle with said fourth surface, whereby said third path is parallel to said first path of incidence and in a direction of propagation opposite to the direction of propagation along said first path when said light beam transmitted through said fourth surface results from the reflection back into said first prism through said second surface of said light beam travelling along said second path from a surface parallel to said first path and perpendicular to said first and second principal planes, and whereby said second and third paths are invariant to rotations of said prism system about either an axis which is perpendicular to said first and second principal planes or an axis which is both parallel to said first and second principal planes and perpendicular to said first path of incidence, and whereby said second and said third paths are invariant to rotations of either said first or said second prisms about either an axis which is perpendicular to said first and second principal planes or an axis which is both parallel to said first and to said second principal planes and perpendicular to said first path of incidence.

5. A prism system according to claim 1 in which said fifth surface lies in a plane different from that plane in which said first surface lies and said second prism is disposed in the opposite direction to said first prism, whereby said third path is parallel to said first path of incidence and in the same direction of propagation as the direction of propagation along said first path when said light beam transmitted through said fourth surface results from the reflection back into said first prism through said second surface of said light beam travelling along said second path from a surface parallel to said first path and perpendicular to said first and said second principal planes, and whereby said second and said third paths are invariant to rotations of said prism system about either an axis which is perpendicular to said first and second principal planes or an axis which is both parallel to said first and second principal planes and perpendicular to said first path of incidence, and whereby said second and said third paths are invariant to rotations of either of said first or said second prisms about either an axis which is perpendicular to said first and second principal planes or an axis which is both parallel to said first and to said second principal planes and perpendicular to said first path of incidence.

6. A prism system according to claim 1 including a glass wedge bonded between said second prism and said fourth surface of said first prism whereby said parallelism between said fifth surface and said first surface is effected.

7. A prism system according to claim 1 including a reflecting means disposed relative to said first path and said second path such that a reflecting surface of said reflecting means is parallel to said first path and perpendicular to said second path, whereby said light beam being reflected out of said first prism through said second surface along said second path is reflected by said reflecting means into said first prism through said second surface and along a path parallel to said second path.

8. A prism system according to claim 7 in which said third surface is folded 90° along a line at the center of said surface in a direction parallel to said first principal plane, the apex of said fold pointing in the same direction as the direction of propagation of said light beam along said first path, and an extension of said apex forming said 45° angle with said fourth surface, whereby said third path is parallel to said first path of incidence and in a direction of propagation opposite to the direction of propagation along said first path, and whereby said second and third paths are invariant to rotations of said prism system about either an axis which is perpendicular to said first and second principal planes or an axis which is both parallel to said first and second principal planes and perpendicular to said first path of incidence, and whereby said second and said third paths are invariant to rotations of either said first or said second prisms about either an axis which is perpendicular to said first and second principal planes or an axis which is both parallel to said first and said second principal planes and perpendicular to said first path of incidence.

9. A prism system according to claim 7 in which said fifth surface lies in a plane different from that plane in which said first surface lies and is disposed in the opposite direction as said first prism, whereby said third path is parallel to said first path of incidence and in the same direction of propagation as the direction of propagation along said first path, and whereby said second and said third paths are invariant to rotations of said prism system about either an axis which is perpendicular to said first and second principal planes or an axis which is both parallel to said first and second principal planes and perpendicular to said first path of incidence, and whereby said second and said third paths are invariant to rotations of either of said first or said second prisms about either an axis which is perpendicular to said first and second principal planes or an axis which is both parallel to said first and to said second principal planes and perpendicular to said first path of incidence.

References Cited

UNITED STATES PATENTS 2,055,684   9/1936   Eppenstein.

FOREIGN PATENTS 129,037   11/1959   U.S.S.R.
628,769   7/1927   France.

DAVID SCHONBERG, *Primary Examiner.*

RONALD J. STERN, *Assistant Examier.*